UNITED STATES PATENT OFFICE.

HARRY O. CHUTE, OF CLEVELAND, OHIO.

PROCESS OF PURIFYING TURPENTINE.

No. 895,003.  Specification of Letters Patent.  Patented Aug. 4, 1908.

Application filed October 19, 1907. Serial No. 398,393.

*To all whom it may concern:*

Be it known that I, HARRY O. CHUTE, a citizen of the United States, residing at Cleveland, Cuyahoga county, State of Ohio, have invented certain new and useful Improvements in Processes of Purifying Turpentine; and I do hereby declare the following to be a full, clear, and exact description of the same, such as will enable others skilled in the art to which it appertains to practice and use the same.

This invention relates to processes of purifying turpentine; and consists in a method of purifying the commercial wood turpentines by treatment with alcohol to remove ill-smelling impurities; all as more fully hereinafter set forth and as claimed.

The wood turpentines rarely have a clean, pure smell such as characterizes the purer turpentines derived from gum turpentine, and for this reason are not generally liked in the trade. Pine wood contains a large proportion of the turpentine bodies which occur in gum turpentine, and "wood turpentines" are therefore now largely prepared by the direct distillation of coniferous wood, either by destructive distillation or by distillation with steam, hot gases or the like. In either form of distillation of wood however, many other volatile bodies are distilled over with the turpentine and contaminate it, giving it an unpleasant odor and causing it to work somewhat differently in many arts from the turpentine of gum turpentine. This is particularly true of the wood turpentine made by destructive distillation of wood, such turpentine containing a wide variety of pyrolytic products of resin and wood. In the turpentine from steam distilled wood and gas distilled wood, these impurities are probably largely terpenes and rosin oils, while in the turpentine from destructive distillation there are also ketones, aldehydes, phenols and many less well defined bodies.

I have discovered that by agitating wood turpentine with more alcohol than it will dissolve, these foreign bodies for the most part will leave the turpentine to dissolve in the alcohol layer. Turpentine is not readily miscible with the lower alcohols, particularly when the latter are not absolute, and upon shaking up turpentine with a sufficient amount of such alcohols, the mass will separate into two layers; one of turpentine containing more or less alcohol but freed of odorous impurities and one of alcohol carrying these impurities together with a little turpentine. The immiscibility of wood alcohol with turpentine is greater than that of grain alcohol, and I therefore at present prefer the former in carrying out my process. But the immiscibility of either alcohol and turpentine can be heightened to any degree desired by the use of a little hydrocarbon; preferably one which is insoluble in alcohol, such as the hydrocarbons from petroleum and particularly Pennsylvania petroleum. Using commercial denatured spirit which already contains a little gasolene, this gasolene will unite with the turpentine and make the alcohol much more insoluble or immiscible than would be pure grain alcohol of the same strength.

When a hydrocarbon is used for heightening the immiscibility of turpentine and alcohol, it is preferably one which boils at a temperature rather far removed from the boiling point of turpentine (158° C.), so that it may afterwards be readily eliminated from the purified turpentine by simple distillation. Preferably it is lower boiling so that it can be distilled off together with alcohol in purifying the treated turpentine, but it may be a very high boiling hydrocarbon, such as vaseline or lubricating oil, if the turpentine itself is to be afterwards distilled. Ordinary low-boiling "petroleum ether," gasolene, naphtha, benzin and like grades of hydrocarbon may be employed, such hydrocarbon being preferably redistilled to free it of impurities having boiling points too near that of turpentine.

Ordinary wood spirit is not miscible to any very great extent with turpentine, and it may be employed directly without the use of hydrocarbon, though such use is advantageous. Grain alcohol is more miscible. However, in either case since the alcohol which dissolves in the turpentine may be afterwards recovered, the limited miscibility of the pure alcohols is not greatly disadvantageous.

The turpentine and alcohol may be agitated together in any suitable form of mixing apparatus and after agitation allowed to stand until gravital separation takes place; after which the turpentine and impure alcohol may be separately drawn off. A hydrocarbon, such as gasolene, may be previously dissolved in the turpentine, or it may be added during or after the agitation. I prefer to add it after having agitated alcohol and turpentine together, as it then apparently makes a better separation of the impurities. It is advantageous to add enough to lighten the turpentine so that it will float on the alcohol. Under these conditions the separation between alcohol and turpentine becomes sharper, less alcohol dissolves in the turpentine and less turpentine in the alcohol, and the impurities from the turpentine can be taken up in less alcohol. The turpentine separated contains a little alcohol and any added hydrocarbon, and is now substantially free of the original foul odor. It may be sent through any ordinary fractionating apparatus to free it of alcohol and low-boiling hydrocarbon, if the latter were used, and form substantially pure, clean smelling, marketable turpentine. In purifying wood turpentine, the alcohol separated is usually very foul-smelling; and particularly so in the case of wood turpentine made by destructive distillation. The alcohol may also be treated in any ordinary type of fractionating apparatus, such as a column still, to free it of the dissolved impurities and adapt it for reuse. The impurities from wood turpentine separated and recovered in this operation are well adapted for denaturing spirit.

In treating turpentine with gasolene and wood alcohol, very little of the latter dissolves in the turpentine, and this small amount is regained in fractionating off the gasolene from the purified turpentine, coming over with the gasolene as an immiscible distillate. The distillate may be returned for use in the process without separating the gasolene and alcohol.

In suing denatured spirit containing gasolene, the gasolene leaves the spirit for the turpentine and is as efficient as specially added gasolene. Such gasolene as remains dissolved in the recovered alcohol is of course equally useful. No heating is necessary in agitating the alcohol and turpentine together though some heat may be used if desired, the heated and agitated mixture being afterwards allowed to cool before gravitally separating the alcohol and turpentine, their immiscibility being greater at low temperatures. Preferably the alcohol employed is fairly strong; say above 80 per cent.; and 95 per cent. is better.

In practical operation of the described process, I may treat 100 gallons of commercial wood turpentine with commercial wood spirit of about 96 per cent., using 25 gallons of such wood spirit. I can add 25 gallons of commercial gasolene to the turpentine, or to the agitated mixture; allow the mixture to stand after agitation and separate. The turpentine I can then distil in a column still or other fractionating apparatus to remove and regain the alcohol or gasolene, or both. The turpentine emerging from the still is directly marketable, or it may be redistilled, as in a current of steam, or otherwise treated, where special grades are desired.

The distilled alcohol from the turpentine, when gasolene has been used, will separate into two layers; one containing most of the gasolene and the other most of the alcohol. The alcohol separated gravitally from the turpentine is also redistilled in any suitable fractionating apparatus, regaining alcohol for reuse. The residue of high-boiling impurities coming from the fractionating apparatus may be utilized as solvents or as denaturing agents. The regained alcohol is directly applicable for reuse.

When a high-boiling hydrocarbon such as vaseline or lubricating oil, is used for promoting immiscibility of alcohol and turpentine, it is best separated from the latter by distilling the turpentine with steam or hot gases.

What I claim is:—

1. The process of purifying wood turpentine which consists in agitating such turpentine and an alcohol together, such alcohol being in sufficient amount to form an immiscible layer gravitally separating the layers and purifying the turpentine.

2. The process of purifying wood turpentine which consists in agitating such turpentine and wood alcohol together, such alcohol being in sufficient amount to form an immiscible layer gravitally separating the layers and purifying the turpentine.

3. The process of purifying wood turpentine which comprises agitating such turpentine, an alcohol and an alcohol-immiscible hydrocarbon together, gravitally separating and purifying the turpentine.

4. The process of purifying wood turpentine which comprises agitating such turpentine, wood alcohol and an alcohol-insoluble hydrocarbon together, gravitally separating and purifying the turpentine.

5. The process of purifying wood turpentine which comprises agitating such turpentine and an alcohol together, adding an alcohol-insoluble hydrocarbon and continuing the agitation, gravitally separating and purifying the turpentine.

6. The process of purifying wood turpentine which comprises agitating such turpentine and wood alcohol together, adding an alcohol-insoluble hydrocarbon and continuing the agitation, gravitally separating and purifying the turpentine.

7. The process of purifying wood turpentine which comprises agitating such turpentine and wood alcohol together, adding gasolene and continuing the agitation, gravitally separating and purifying the turpentine.

In testimony whereof I affix my signature, in the presence of two witnesses.

HARRY O. CHUTE.

Witnesses:
K. P. McELROY,
ALFRED M. HOUGHTON.